US009717063B2

(12) United States Patent
Ali et al.

(10) Patent No.: US 9,717,063 B2
(45) Date of Patent: Jul. 25, 2017

(54) CARD TOOLKIT SUPPORT FOR IP MULTIMEDIA SUBSYSTEM

(75) Inventors: Syed Hussain Ali, Waterloo (CA); Jean-Philippe Cormier, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/384,704

(22) PCT Filed: Dec. 23, 2010

(86) PCT No.: PCT/IB2010/056064
§ 371 (c)(1),
(2), (4) Date: Jan. 18, 2012

(87) PCT Pub. No.: WO2012/085624
PCT Pub. Date: Jun. 28, 2012

(65) Prior Publication Data
US 2014/0010148 A1    Jan. 9, 2014

(51) Int. Cl.
*H04W 60/00* (2009.01)
*H04W 4/00* (2009.01)
*H04L 29/06* (2006.01)

(52) U.S. Cl.
CPC ......... *H04W 60/00* (2013.01); *H04L 65/1016* (2013.01); *H04L 65/1073* (2013.01); *H04W 4/003* (2013.01)

(58) Field of Classification Search
CPC ..... H04W 4/001; H04W 8/205; H04W 4/003; H04W 12/04; H04W 92/08; H04W 60/00;
(Continued)

(56) References Cited

U.S. PATENT DOCUMENTS 6,591,116 B1    7/2003  Laurila et al.
7,596,150 B2 *  9/2009  Baird ................ H04L 29/06027
                                                370/351
(Continued)

FOREIGN PATENT DOCUMENTS

CN      101043744       9/2007
CN      101272251       9/2008
(Continued)

OTHER PUBLICATIONS

3GPP TS 31.111 v1 0.0.0 (Oct. 2010), 3rd Generation Partnership Project: Technical Specification Group Core Network and Terminals; Universal Subscriber Identity Module (USIM) Application Toolkit (USAT) (release 10) p. 1-110.*
(Continued)

*Primary Examiner* — Charles C Jiang
*Assistant Examiner* — Kyaw Z Soe
(74) *Attorney, Agent, or Firm* — Fish & Richardson P.C.

(57)    ABSTRACT

A method, system and computer-usable medium are provide for managing the Open Channel for IMS command correctly the UICC to have knowledge about the specific status codes the ME received from IMS. This knowledge allows the UICC to make a smarter decision on what it attempts to do to access IMS. Accordingly, the UICC is provided with detailed information about the status codes from the IMS service to allow the UICC to make an informed decision. If the UICC does not have such knowledge, it is possible that the UICC will send potentially unwanted commands to the ME to establish access to IMS.

10 Claims, 9 Drawing Sheets

(58) Field of Classification Search
CPC . H04L 67/34; H04L 63/0428; H04L 63/0853; H04L 63/06; H04L 63/083; H04L 69/08; H04L 67/02; H04L 67/04; H04L 65/1016; H04L 65/1073
USPC ......................................................... 370/328
See application file for complete search history.

(56) References Cited

U.S. PATENT DOCUMENTS

| | | | |
|---|---|---|---|
| 8,447,836 B2* | 5/2013 | Mahalal et al. ............... | 709/219 |
| 8,489,143 B2* | 7/2013 | Dong ............................ | 455/558 |
| 8,503,376 B2* | 8/2013 | Cha et al. ..................... | 370/329 |
| 8,553,679 B2 | 10/2013 | Gorti | |
| 8,606,319 B2 | 12/2013 | Ali et al. | |
| 8,666,385 B2* | 3/2014 | Li ................................. | 455/419 |
| 2003/0045290 A1 | 3/2003 | Tuohimetsa et al. | |
| 2003/0073440 A1* | 4/2003 | Mukherjee .................... | H04L 12/58 455/435.1 |
| 2004/0103157 A1* | 5/2004 | Requena ........................ | H04L 29/06 709/206 |
| 2004/0184452 A1 | 9/2004 | Huotari | |
| 2004/0243680 A1 | 12/2004 | Mayer | |
| 2004/0260791 A1 | 12/2004 | Jerbi | |
| 2005/0021875 A1* | 1/2005 | Bouthemy ..................... | H04W 92/08 709/250 |
| 2005/0105511 A1* | 5/2005 | Poikselka ...................... | H04L 67/147 370/352 |
| 2005/0235149 A1 | 10/2005 | Beckmann | |
| 2005/0259673 A1* | 11/2005 | Lu ................................. | H04W 92/08 370/419 |
| 2006/0155814 A1* | 7/2006 | Bennett ......................... | H04L 29/06027 709/207 |
| 2006/0178135 A1 | 8/2006 | Jiang | |
| 2006/0268904 A1* | 11/2006 | Bae ............................... | H04M 3/42042 370/401 |
| 2007/0060097 A1 | 3/2007 | Edge et al. | |
| 2007/0077912 A1 | 4/2007 | Mahajan | |
| 2007/0094691 A1 | 4/2007 | Gazdzinski | |
| 2007/0174443 A1 | 7/2007 | Shaheen | |
| 2007/0207798 A1 | 9/2007 | Talozi et al. | |
| 2007/0239857 A1* | 10/2007 | Mahalal ......................... | H04L 63/083 709/219 |
| 2007/0265022 A1 | 11/2007 | Bengtsson | |
| 2008/0139166 A1 | 6/2008 | Agarwal | |
| 2008/0155658 A1 | 6/2008 | Leinonen | |
| 2008/0214240 A1 | 9/2008 | Choi | |
| 2008/0293407 A1 | 11/2008 | Cormier et al. | |
| 2008/0301785 A1 | 12/2008 | Beyer et al. | |
| 2009/0055899 A1 | 2/2009 | Deshpande et al. | |
| 2009/0068996 A1 | 3/2009 | Bakker et al. | |
| 2009/0093249 A1 | 4/2009 | Zhu et al. | |
| 2009/0098851 A1 | 4/2009 | Liebhart | |
| 2009/0190577 A1 | 7/2009 | Allen | |
| 2009/0209232 A1* | 8/2009 | Cha .............................. | H04L 63/0428 455/411 |
| 2009/0213794 A1* | 8/2009 | Rotsten ......................... | H04L 12/66 370/328 |
| 2009/0215454 A1* | 8/2009 | Przybysz ....................... | H04M 15/00 455/435.1 |
| 2009/0215490 A1* | 8/2009 | Lee ............................... | G06K 19/0701 455/558 |
| 2009/0235299 A1* | 9/2009 | Astrom ......................... | H04L 29/06027 725/25 |
| 2009/0252309 A1 | 10/2009 | Beyer et al. | |
| 2009/0319906 A1 | 12/2009 | White et al. | |
| 2010/0048176 A1 | 2/2010 | Osborn | |
| 2010/0056143 A1 | 3/2010 | Yang | |
| 2010/0081434 A1* | 4/2010 | Ahluwalia ..................... | H04W 60/06 455/435.1 |
| 2010/0084465 A1* | 4/2010 | Jolivet .......................... | G06K 7/0008 235/439 |
| 2010/0085937 A1 | 4/2010 | Pressley et al. | |
| 2010/0136970 A1* | 6/2010 | Mui ............................... | H04L 65/1073 455/435.1 |
| 2010/0138525 A1 | 6/2010 | Dong | |
| 2010/0177769 A1 | 7/2010 | Barriga et al. | |
| 2010/0227588 A1* | 9/2010 | Bradley ........................ | H04L 63/0209 455/411 |
| 2010/0248748 A1* | 9/2010 | Dong ............................ | G01S 19/03 455/456.6 |
| 2010/0262699 A1 | 10/2010 | Bakker | |
| 2010/0312897 A1* | 12/2010 | Allen ............................ | H04L 12/1822 709/227 |
| 2010/0329243 A1* | 12/2010 | Buckley ........................ | H04W 48/18 370/352 |
| 2011/0028126 A1 | 2/2011 | Lim et al. | |
| 2011/0040836 A1* | 2/2011 | Allen ............................ | H04L 65/1093 709/205 |
| 2011/0055565 A1 | 3/2011 | Murakami et al. | |
| 2011/0077051 A1 | 3/2011 | Brown | |
| 2011/0119357 A1* | 5/2011 | Lindholm ..................... | H04L 29/12273 709/220 |
| 2011/0136471 A1 | 6/2011 | Chen et al. | |
| 2011/0252140 A1* | 10/2011 | Seif .............................. | H04L 63/0428 709/226 |
| 2011/0319133 A1* | 12/2011 | Dong ............................ | H04W 8/205 455/558 |
| 2012/0106570 A1* | 5/2012 | Li ................................. | H04W 48/18 370/463 |
| 2012/0115477 A1 | 5/2012 | Ali et al. | |
| 2012/0115542 A1 | 5/2012 | Griffin et al. | |
| 2012/0142332 A1* | 6/2012 | Li ................................. | H04W 4/001 455/419 |
| 2012/0166654 A1 | 6/2012 | Ali et al. | |
| 2012/0238244 A1* | 9/2012 | Ennesser ...................... | G06F 21/606 455/410 |
| 2012/0275312 A1 | 11/2012 | Cormier | |
| 2013/0028179 A1* | 1/2013 | Sedlacek ...................... | H04L 65/1073 370/328 |

FOREIGN PATENT DOCUMENTS

| | | |
|---|---|---|
| CN | 101785357 | 7/2010 |
| EP | 1059822 A2 | 12/2000 |
| EP | 1995986 A1 | 11/2008 |
| EP | 2028910 A1 | 2/2009 |
| EP | 2182430 | 5/2010 |
| JP | 2001-016634 | 1/2001 |
| JP | 2010-057113 | 3/2010 |
| WO | 2005115028 A1 | 12/2005 |
| WO | 2010/072243 | 7/2010 |

OTHER PUBLICATIONS

Communication under Rule 71(3) EPC issued in European Application No. 12165685.4 on Feb. 20, 2014.
3GPP TS 31.111 V10.2.0 (Apr. 2011); "3rd Generation Partnership Project; Technical Specification Group Core Network and Terminals; Universal Subscriber Identity Module (USIM) Application Toolkit (USAT) (Release 10)"; Apr. 2011; pp. 1-115.
3GPP TS 31.111 V10.3.0 (Jun. 2011); "3rd Generation Partnership Project; Technical Specification Group Core Network and Terminals; Universal Subscriber Identity Module (USIM) Application Toolkit (USAT) (Release 10)"; Jun. 2011; pp. 1-116.
ETSI TS 102 223 V10.2.0 (Mar. 2011); "Smart Cards; Card Application Toolkit (CAT) (Release 10)"; Mar. 2011; 226 pages.
Gemalto, et al.; "BIP Open Channel for IMS"; 3GPP TSG-CT6#53 (C6-090430); Beijing, China; Nov. 10-13, 2009; 14 pages.
Research in Motion UK Limited; "Introduction of the IARI Based Registration Event"; 3GPP TSG CT6 Meeting #59 (C6-110124); Salt Lake City, US; Jan. 22-25, 2011; 20 pages.
Office Action issued in U.S. Appl. No. 13/353,042 on May 17, 2012; 13 pages.
Office Action issued in U.S. Appl. No. 13/353,042 on Jul. 27, 2012; 12 pages.
Extended European Search Report issued in European Application No. 12156767.1 on Sep. 19, 2012; 9 pages.

(56) References Cited

OTHER PUBLICATIONS

Extended European Search Report issued in European Application No. 12165685.4 on Sep. 6, 2012; 6 pages.
Office Action issued in U.S. Appl. No. 13/352,985 on Mar. 5, 2013; 9 pages.
Office Action issued in U.S. Appl. No. 13/352,985 on Apr. 2, 2012; 9 pages.
International Search Report and Written Opinion for PCT Application No. PCT/IB2010/056064, mailed Aug. 29, 2011.
International Search Report and Written Opinion for PCT Application No. PCT/US2010/053374, mailed Jul. 22, 2011.
International Search Report and Written Opinion for PCT Application No. PCT/CA2011/050254, mailed Jan. 6, 2012.
Office Action issued in U.S. Appl. No. 13/451,125 on Feb. 7, 2014; 18 pages.
Office Action issued in U.S. Appl. No. 13/353,042 on Oct. 23, 2013; 16 pages.
International Preliminary Report on Patentability under Chapter I issued in International Application No. PCT/CA2011/050254 on Nov. 7, 2013; 7 pages.
Nokia Siemens Networks et al.; "Rejection Due to Per APN Congestion"; 3GPP TSG-CT WG1 Meeting #67, C1-105178; Barcelona, Spain, Nov. 19, 2010; 10 pages.
Office Action issued in U.S. Appl. No. 13/352,985 on Dec. 4, 2012; 13 pages.
3GPP CT6 #57; "Change Request"; C6-100638; Lisbon, Portugal; Nov. 16-19, 2010; 9 pages.
3GPP TSG CT WG6 Ad-hoc #127; "Change Request"; C6a-100304; Conf. Call; Nov. 8, 2010; 6 pages.
Rosenberg, J. et al.; Indicating User Agent Capabilities in the Session Initiation Protocol (SIP); Network Working Group Request for Comments: 3840; 2004; 36 pages.
Partial Search Report issued in European Application No. 12162746.7 on Jul. 29, 2014; 8 pages.
Office Action issued in Japanese Application No. 2013-545516 issued on Jun. 17, 2014; 7 pages.
Office Action issued in Japanese Application No. 2013-534882 on Jun. 30, 2014; 10 pages.
Office Action issued in Korean Application No. 10-2013-7018741 on Jun. 13, 2014; 3 pages.

Notice of Allowance issued in U.S. Appl. No. 13/384,709 on Jul. 31, 2013; 13 pages.
Communication Pursuant to Article 94(3) EPC issued in European Application No. 12165685.4 on May 16, 2013; 3 pages.
Communication Pursuant to Article 94(3) EPC issued in European Application No. 12165685.4 on Sep. 26, 2013; 4 pages.
Office Action issued in Chinese Application No. 201210127047.5 on May 6, 2014; 5 pages.
3GPP TS 31.111 V10.1.0 (Jan. 2011); "3rd Generation Partnership Project; Technical Specification Group Core Network and Terminals; Universal Subscriber Identity Module (USIM) Application Toolkit (USAT) (Release 10)"; Jan. 2011.
3GPP, TSG-WG1 Meeting #67, C1-105178, "Rejection due to per APN Congestion" Barcelona, Spain, Oct. 11-15, 2010.
3GPP TSG CT WG6 Ad-hoc #126; "Change Request"; C6a-100203; Conf. Call; Oct. 22, 2010, 6 pages.
ST-Ericsson, Research in Motion, "Reference update and restoration of the Terminal Profile's bytes with letter class," 3GPP CT6 #57 C6-100638, Nov. 18, 2010.
Research in Motion; "Introduction of the IARI Based Routing for UICC Access to IMS"; 3GPP TSG CT WG6 Ad-hoc #126 (C6a-100203); Oct. 21, 2010.
Extended European Search Report in European Application No. 121627467.7, dated Dec. 23, 2014, 12 pages.
Office Action issued in Chinese Application No. 201080070862.1 on Nov. 16, 2016.
Office Action issued in Chinese Application No. 201080070862.1 on May 11, 2016.
ETSI TS 102 223 V8.2.0 (Jan. 2009), Smart Cards; Card Application Toolkit (CAT) (Release 8), pp. 44 and 101 (2 pages total).
3GPP TS 24.229 V10,1.0 (Sep. 2010); "3rd Generation Partnership Project; Technical Specification Group Core Network and Terminals; IP Multimedia Call Control Protocol Based on Session Initiation Protocol (SIP) and Session Description Protocol (SDP); Stage 3 (Release 10)"; Sep. 23, 2010; pp. 1-678.
3GPP TS 31.103 V9.1.0 (Oct. 2010); "3rd Generation Partnership Project; Technical Specification Group Core Network and Terminals; Characteristics of the IP Multimedia Services Identity Module (ISIM) Application (Release 9)"; Oct. 3, 2010; pp. 1-42.
Communication Pursuant to Article 94(3) EPC issued in European Application No. 10775981.2 on May 2, 2017.

\* cited by examiner

CARD TOOLKIT SUPPORT FOR IP MULTIMEDIA SUBSYSTEM

BACKGROUND OF THE INVENTION

Field of the Invention

The present invention is directed in general to communications systems and methods for operating same, and more particularly to card toolkit support for Internet Protocol (IP) multimedia subsystems within communications systems.

Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a user agent (UA), such as user equipment (UE) or mobile equipment (ME), with access to other components in a telecommunications system.

In mobile communication systems such as an E-UTRAN, the access device provides radio accesses to one or more UAs. The access device comprises a packet scheduler for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for physical downlink shared channel (PDSCH) and physical uplink shared channel (PUSCH) data transmissions, and sends scheduling information to the UAs through a control channel. The UAs refer to the scheduling information for the timing, frequency, data block size, modulation and coding of uplink and downlink transmissions.

In certain mobile communication systems, there is a requirement for a universal integrated circuit card (UICC) application (e.g., a subscriber identity module (SIM), an Internet Protocol (IP) multimedia subsystem (IMS) SIM (ISIM), and a universal terrestrial radio access network (UTRAN) SIM (USIM)) may make use of Internet Protocol (IP) multimedia subsystem (IMS) functionalities controlled by mobile equipment (ME). See e.g., 3GPP TS 22.101. For example, FIG. 1, labeled Prior Art, shows a block diagram of an operation where a UICC application invites a peer to a session. FIG. 2, labeled Prior Art, shows an example of a UICC to IMS channel establishment operation. FIG. 3, labeled Prior Art, shows an example of a UICC to IMS communication. In this example, an IMS UICC user initiated registration is performed where an IMS Subscriber Identity module (ISIM) is present.

It is possible that UICC to ME commands may include an open channel for IMS function which extends known Bearer Independent Protocol (BIP) commands for IMS like Close Channel, Send data, Receive data and Get Channel Status to allow the channel to use the IMS as a means to send and receive IMS traffic to and from the UICC.

In certain known systems (e.g., 3GPP 31.111 v. 9.1.0) the UICC can use the Open Channel request to activate a PDP Context and to send IP data from the UICC to the network on an access point name (APN) chosen by the UICC. This function is in place under hospices of BIP that would allow for IP based over the air (OTA) updating of the UICC to replace the aging short message service (SMS) push and SMS transport currently in use.

The Open Channel request can present challenges where the UICC is another IMS application on the UE. Because like other applications this IMS application requires specific registration with the IMS service. FIG. 4, labeled Prior Art, shows an example of how the UICC does not have knowledge of what is occurring at the IMS layers. FIG. 5, labeled Prior Art, shows a flow diagram representing how IMS deregistration indication does not contain clear cause/reject indications of why this deregistration occurred in the first place.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

A method, system and computer-usable medium are provided for managing the Open Channel for IMS command correctly by the UICC to have knowledge about the specific status code the ME received from IMS. This knowledge allows the UICC to make a smarter decision on when it attempts to access IMS. Accordingly, the UICC is provided with detailed information about the status code from the IMS service to allow the UICC to make an informed decision. If the UICC does not have such knowledge, it is possible that the UICC will send potentially unwanted commands to the ME to establish access to IMS.

More specifically, in certain embodiments, the Network Rejection event USIM Application Toolkit (USAT) command is expanded to accommodate for IMS registration errors by providing a command parameter that includes IMS rejection cause codes or IMS status codes.

Also, in certain embodiments, the system enhances a cause code parameter by allowing the cause code to be larger than one byte. In this embodiment, the Network Rejection event mechanism is expanded to contain a cause code to support variable length cause codes.

Also, in certain embodiments, the system provides an IMS registration error event to support IMS registration errors. More specifically, a USAT command is provided which is similar to the Network Rejection event to support IMS registration errors. In another embodiment the IMS registration error event is combined with an IMS connectivity event to have the ME register to a single event for successful registrations and unsuccessful ones. The ME shall then send to the UICC different envelope commands for each type of event using only a single bit in the EVENT LIST and in the Terminal Profile.

Figure 1:
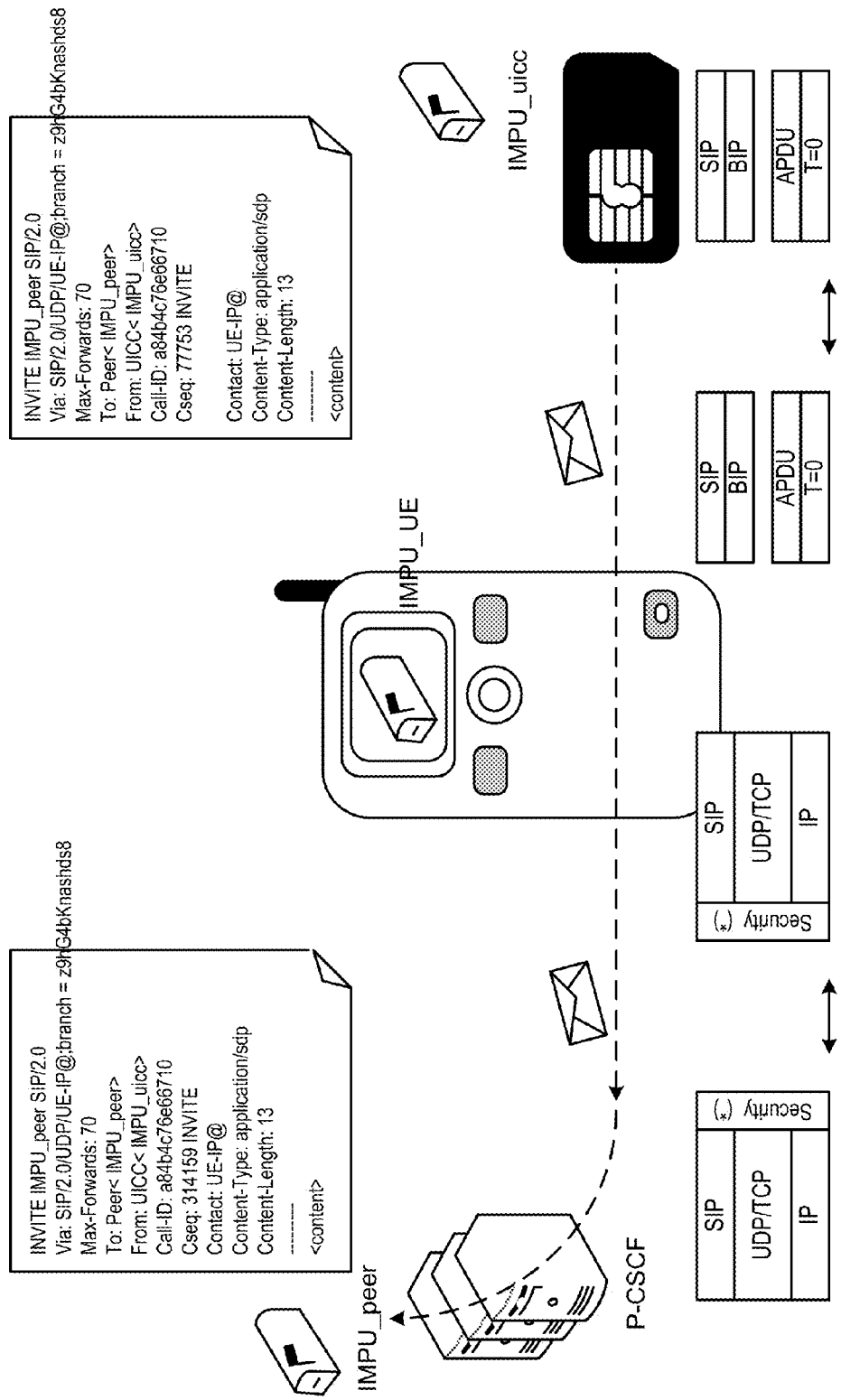
FIG. 1, labeled Prior Art, shows a block diagram of a UICC invite a peer to session operation.
Figure 2:
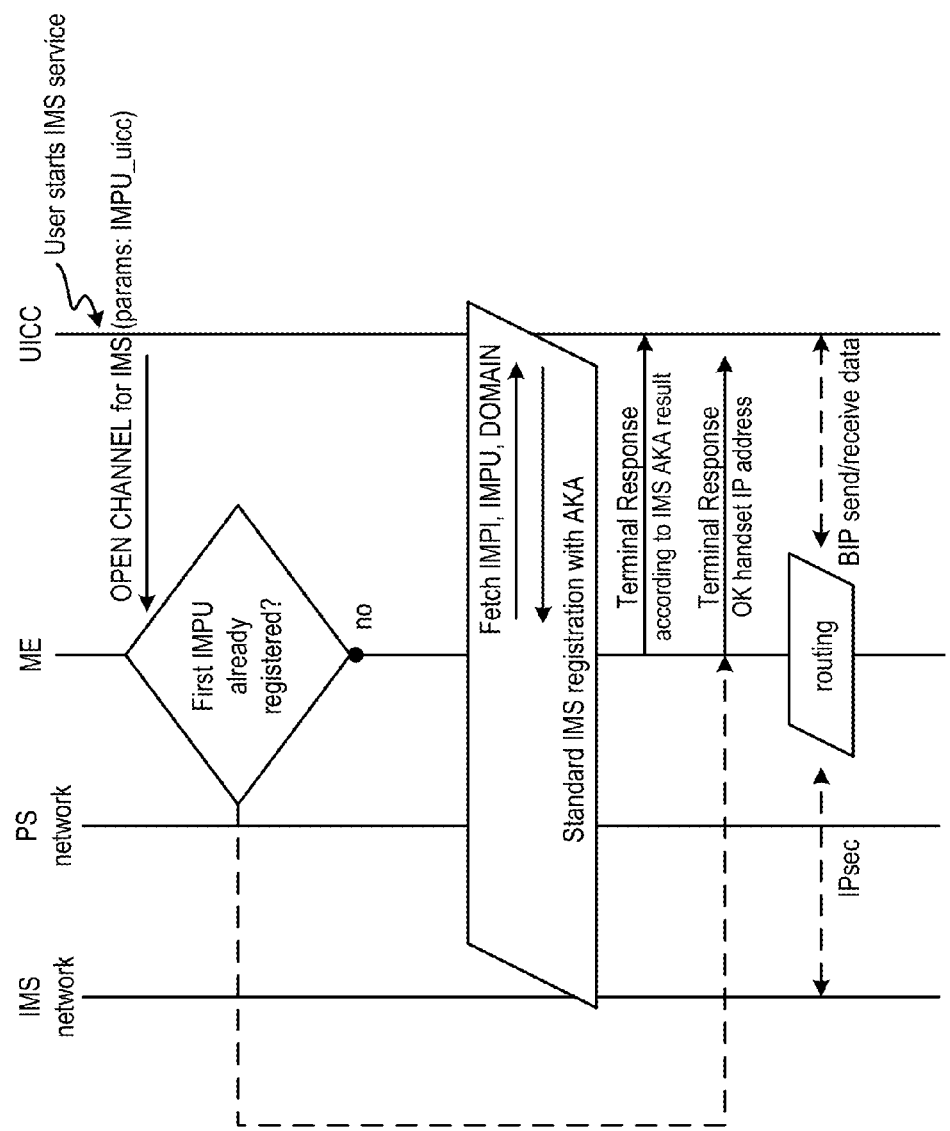
FIG. 2, labeled Prior Art, shows a flow diagram of a UICC to IMS channel establishment operation.
Figure 3:
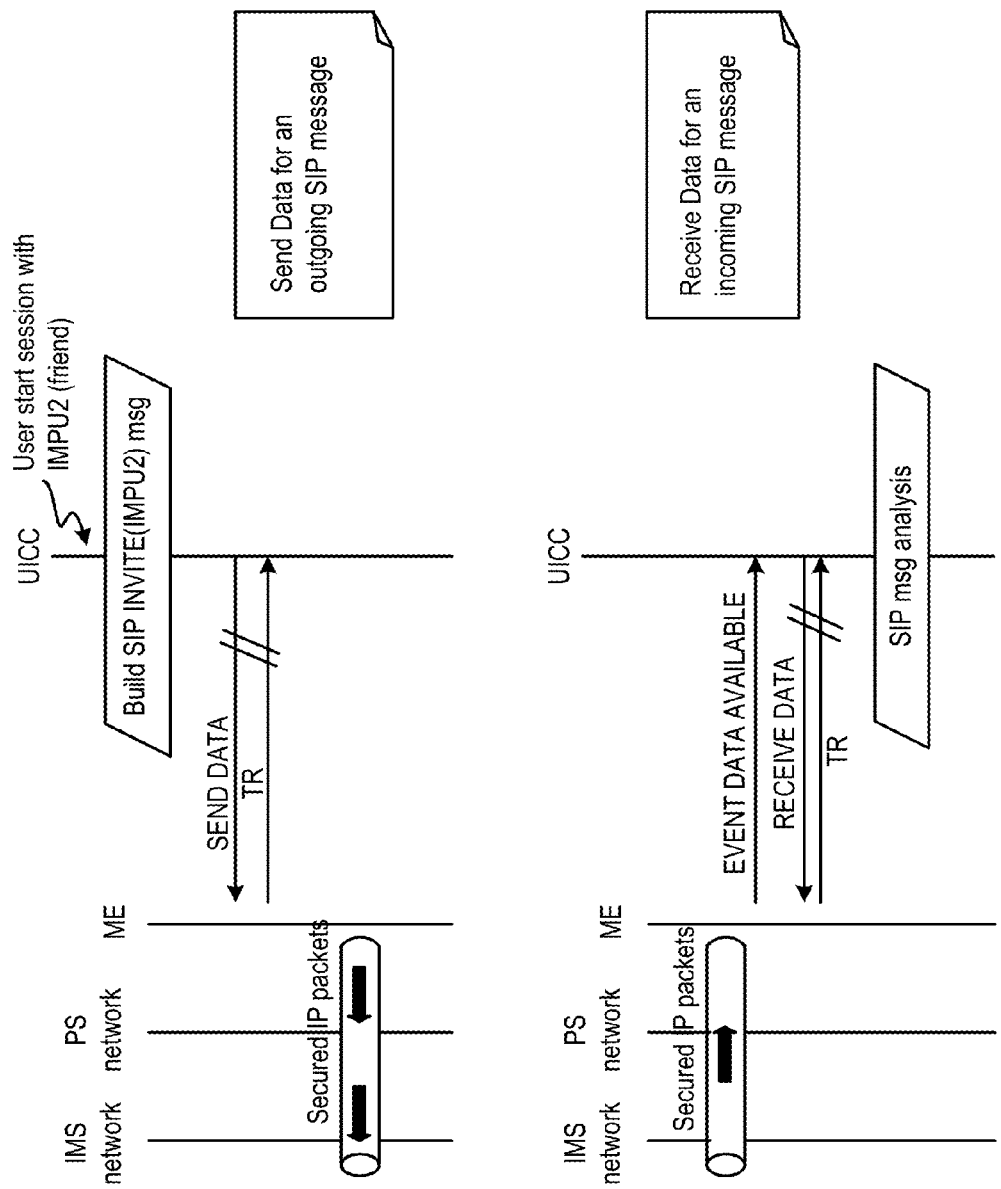
FIG. 3, labeled Prior Art, shows a flow diagram of an IMS data transmission.
Figure 4:
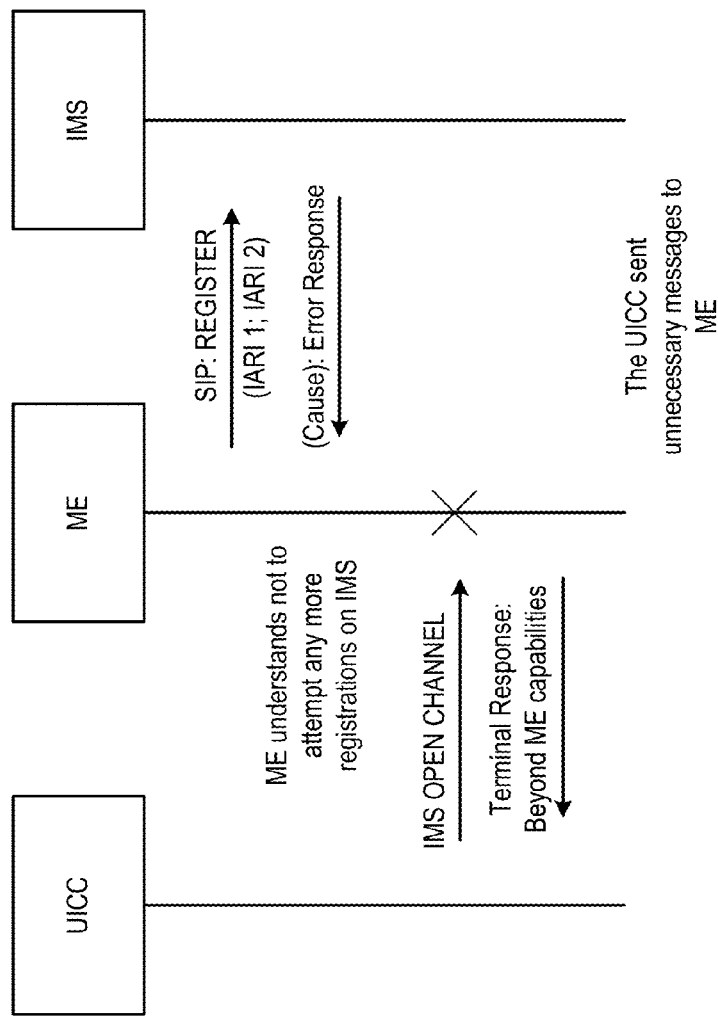
FIG. 4, labeled Prior Art, shows a flow diagram of how a UICC does not have knowledge of communication occurring between ME and IMS layers.
Figure 5:
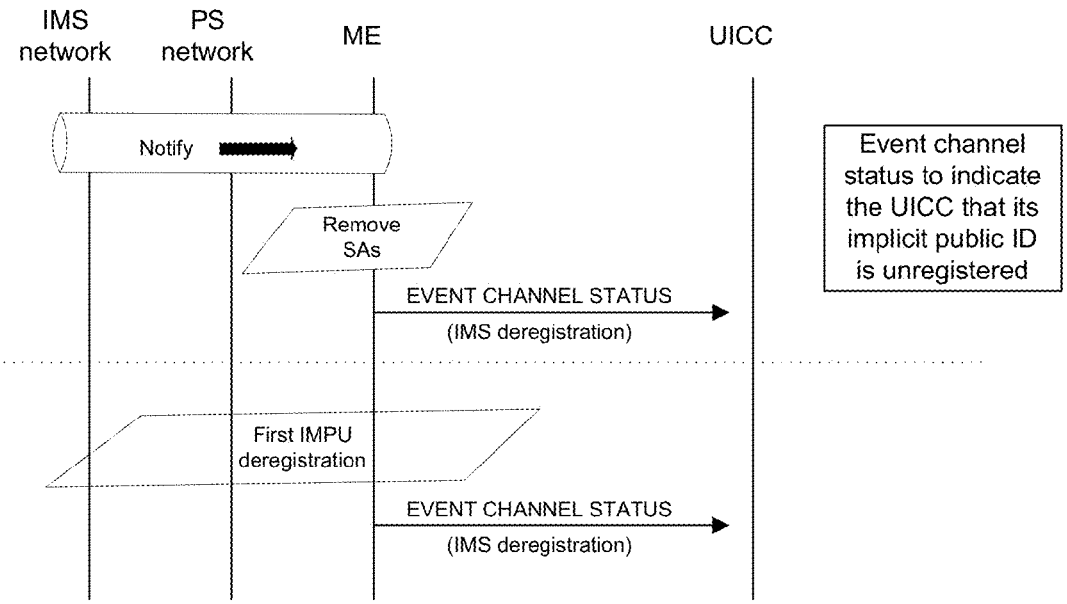
FIG. 5, labeled Prior Art, shows a flow diagram of how an IMS deregistration indication to a card does not contain clear cause/reject codes.
Figure 6:
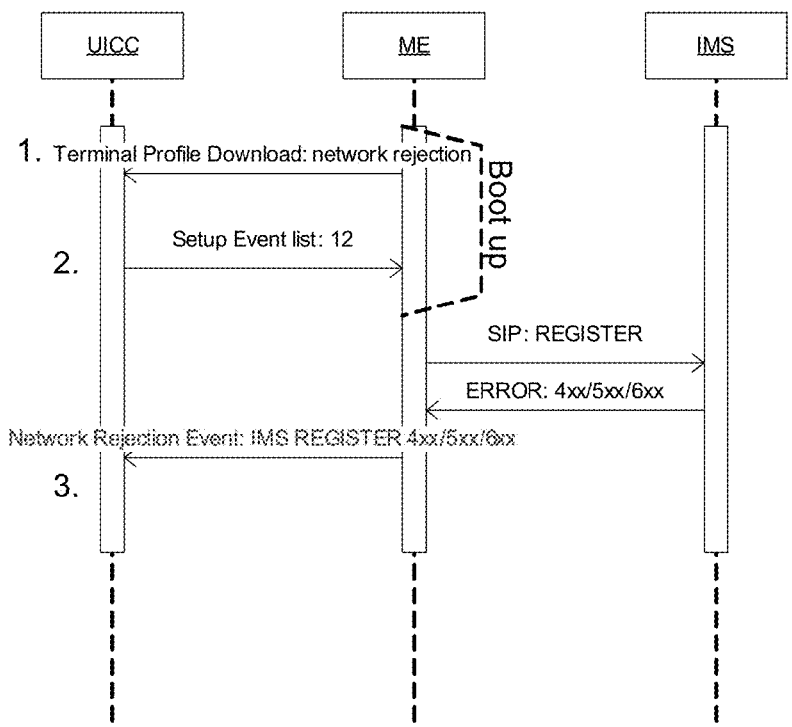
FIG. 6 shows a flow diagram of an IMS registration error being communicated via a Network Rejection Event.

Referring now to FIG. 6, a flow diagram of the operation of a system for communicating IMS registration error via a Network Rejection Event is shown. More specifically, in certain embodiments the Network Rejection Event includes an IMS registration error command parameter.

In certain embodiments, the UICC discovers support of the network rejection event feature by reading certain bits (e.g., the $5^{th}$ and $7^{th}$ bits) of a byte of a download profile. In certain embodiments, the byte of the download profile of the Twenty-fifth byte of the profile download sent by the ME.

Figure 7:
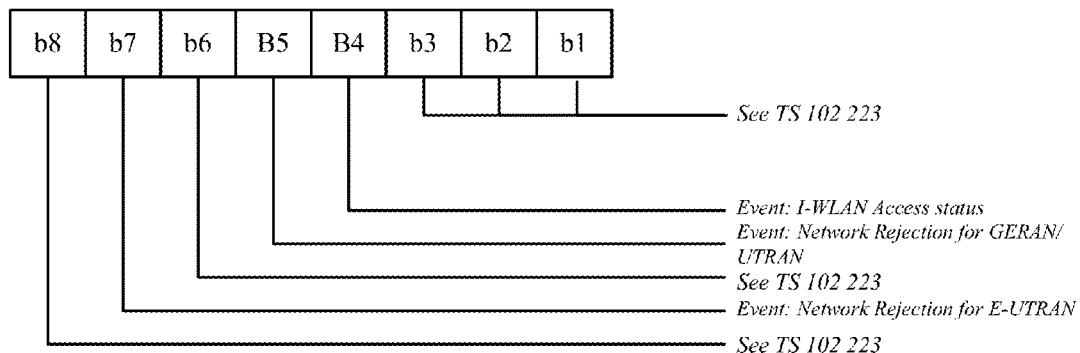
FIG. 7 shows a mapping of a download profile byte which includes Network Rejection event bits.

FIG. 7 shows a mapping of an event driven information extension. In this mapping, one bit is used for a Network Rejection Event for a GERAN/UTRAN network and one bit is used to indicate a Network Rejection Event for a E-UTRAN network.

If the event driven information extension is supported in any radio technology, the UICC proceeds with registering the Network Rejection event in a SETUP EVENT LIST (U)SAT command to enable receipt of the rejection messages. More specifically, the UICC uses the SETUP EVENT LIST (U)SAT command to supply a set of events. This set of events becomes the current list of events for which the terminal is to monitor. Any subsequent SET UP EVENT LIST command replaces the current list of events supplied in the previous SET UP EVENT LIST command. The SET UP EVENT LIST command may also be used to remove the entire list of events that is current in the terminal (see e.g., clause 6.6.16 of ETSI TS 102 223 v9.1.0). The list of events provided by the UICC in the last SET UP EVENT LIST command is removed if the terminal is powered off or the UICC is removed or a reset is performed. When the terminal has successfully accepted or removed the list of events, the terminal sends a TERMINAL RESPONSE (OK) message to the UICC. When the terminal is not able to successfully accept or remove the list of events, the terminal sends a TERMINAL RESPONSE (Command beyond terminal's capabilities) message to the UICC. When one of the events in the current list occurs, then the terminal uses the Event Download mechanism to transfer details of the event to the UICC (see e.g., clause 7.5 of ETSI TS 102 223 v9.1.0 and 3GPP 31.111 v. 9.1.0).

For the event list byte coding, a plurality of values are defined in addition to those in ETSI TS 102 223 v. 9.1.0. These values include:

11=I-WLAN Access Status.
12=Network Rejection
15=CSG cell selection

When the ME receives an IMS registration error message from the network in response to an IMS REGISTER message and the Network Rejection event is registered on the rejection Event list the ME informs the UICC that this event has occurred.

More specifically, if the Network Rejection event is part of the current event list (as set up by the last SET UP EVENT LIST command, (see e.g., ETSI TS 102 223 v. 9.1.0), then, in the case of GERAN/UTRAN if the terminal receives a LOCATION UPDATING REJECT message or a GPRS ATTACH REJECT message or a ROUTING AREA UPDATE REJECT message (as defined in TS 24.008) or is unsuccessful in registering to IMS or in the case of E-UTRAN if the terminal receives an ATTACH REJECT message, TRACKING AREA UPDATE REJECT message or is unsuccessful in registering to IMS, the terminal informs the UICC that this event has occurred, by using the ENVELOPE (EVENT DOWNLOAD—Network Rejection Event) command. The direction of the command is ME to UICC and the command header is specified in 3GPP TS 31.101. The structure of the ENVELOPE (EVENT DOWNLOAD—Network Rejection Event) command is set forth in Table 1.

Command parameters/data.

TABLE 1

| Description | Clause | M/O | Min | Length |
|---|---|---|---|---|
| Event download tag | 9.1 | M | Y | 1 |
| Length (A + B + (C or D or I) + E + F + G + H) + J | — | M | Y | 1 |
| Event list | 8.25 | M | Y | A |
| Device identities | 8.7 | M | Y | B |
| Location Information | 8.19 | C | N | C |
| Routing Area Identification | 8.91 | C | N | D |
| Tracking Area Identification | 8.99 | C | N | I |
| Access Technology | 8.62 | M | Y | E |
| Update/Attach Type | 8.92 | M | Y | G |
| Rejection Cause Code | 8.93 | M | Y | H |
| IMS Rejection status code | x.xx | C | N | J |

Event list: the Event list data object shall contain only one event (value part of length 1 byte), and terminal shall set the event to:
Network Rejection Event.
Device identities: the terminal shall set the device identities to:
source: Network;
destination: UICC.
Location information: This data object shall only be present when the ME receives a LOCATION UPDATING REJECT message, and shall contain the identification (MCC, MNC, and LAC) of the rejecting network.
Routing Area Identification: This data object shall only be present when the ME receives a GPRS ATTACH REJECT message or a ROUTING AREAD UPDATE REJECT message and shall contain the identification (MCC, MNC, LAC and RAC) of the rejecting network
Tracking Area Identification: This data object shall only be present when the ME receives an EMM ATTACH REJECT or a TRACKING AREA UPDATE REJECT message and shall contain the identification (MCC, MNC and TAC) of the rejecting network.
Access Technology: This data object shall contain the access technology of the rejecting network.

Update/Attach Type: This data object contains the update or attach type that was used in the registration request message.

Rejection Cause Code: This data object contains the cause code value that was received in the registration or reject message.

IMS Rejection status code: This data object contains the status code value that was received in the IMS registration response message. This data object will only be present during unsuccessful IMS registrations.

The update and attach parameters for the message are set forth in Table 2.

TABLE 2

| Byte(s) | Description | Length |
|---------|-------------|--------|
| 1 | Update/Attach Type Tag | 1 |
| 2 | Length | 1 |
| 3 | Update/Attach Type | 1 |

Contents:
  In the case of GERAN/UTRAN, the terminal shall use this information as a mechanism to indicate to the UICC the location updating type that was sent in the LOCATION UPDATING REQUEST MESSAGE or the update type that was sent in the GPRS ATTACH REQUEST or ROUTING AREA UPDATING REQUEST message, as specified in TS 24.008 [9].
  In the case of E-UTRAN, the terminal shall use this information as a mechanism to indicate to the UICC the EPS attach type that was sent in the ATTACH REQUEST or TRACKING AREA UPDATE REQUEST message, as specified in TS 24.301 [46].
  In the case of an unsuccessful registration to IMS, the terminal shall use this information as a mechanism to indicate to the UICC that an IMS REGISTER message was transmitted, as specified in TS 24.229.

Coding:
  '00'="Normal Location Updating" in the case of a LOCATION UPDATING REQUEST message;
  '01'="Periodic Updating" in the case of a LOCATION UPDATING REQUEST message;
  '02'="IMSI Attach" in the case of a LOCATION UPDATING REQUEST message;
  '03'="GPRS Attach" in the case of a GPRS ATTACH REQUEST message;
  '04'="Combined GPRS/IMSI Attach" in the case of a GPRS ATTACH REQUEST message;
  '05'="RA Updating" in the case of a ROUTING AREA UPDATE REQUEST message;
  '06'="Combined RA/LA Updating" in the case of a ROUTING AREA UPDATE REQUEST message;
  '07'="Combined RA/LA Updating with IMSI Attach" in the case of a ROUTING AREA UPDATE REQUEST message;
  '08'="Periodic Updating" in the case of a ROUTING AREA UPDATE REQUEST message
  '09'="EPS Attach" in the case of an EMM ATTACH REQUEST message
  '0A'="Combined EPS/IMSI Attach" in the case of an EMM ATTACH REQUEST message
  '0B'="TA updating" in the case of an EMM TRACKING AREA UPDATE REQUEST message
  '0C'="Combined TA/LA updating" in the case of an EMM TRACKING AREA UPDATE REQUEST message
  '0D'="Combined TA/LA updating with IMSI attach" in the case of an EMM TRACKING AREA UPDATE REQUEST message
  '0E'="Periodic updating" in the case of an EMM TRACKING AREA UPDATE REQUEST message
  '0F'=IMS REGISTER message.
  All other values are reserved for future use The rejection cause code object parameters for the message are set forth in Table 3.

TABLE 3

| Byte(s) | Description | Length |
|---------|-------------|--------|
| 1 | Rejection Cause Code Tag | 1 |
| 2 | Length | 1 |
| 3 | Rejection Cause Code (Note) | 1 |

For GERAN/UTRAN, in the case of a LOCATION UPDATING REJECT message, this object shall contain the Reject Cause as received in the LOCATION UPDATING REJECT message. The Reject Cause is coded in the same manner as the value part of the Reject Cause information element as specified in TS 24.008

For GERAN/UTRAN, in the case of a GPRS ATTACH REJECT message or a ROUTING AREA UPDATE REJECT message, this object shall contain the GMM Cause as received in the GPRS ATTACH REJECT message or ROUTING AREA UPDATE REJECT message. The GMM Cause is coded in the same manner as the value part of the GMM Cause information element as specified in TS 24.008.

For E-UTRAN, in the case of an EMM ATTACH REJECT message or an EMM TRACKING AREA UPDATE REJECT message, this object shall contain the EMM Cause are received in the EMM ATTACH REJECT message or EMM TRACKING AREA UPDATE REJECT message. The EMM Cause is coded in the same manner as the value part of the EMM Cause information element as specified in TS 24.301.

In the case where the ME receives an error in response to an IMS REGISTER message, the Rejection Cause Code described in Table 3 is coded as 0xFF. The IMS status code object parameters are set forth in Table 4.

TABLE 4

| Byte(s) | Description | Length |
|---------|-------------|--------|
| 1 | IMS status code Tag | 1 |
| 2 | Length | 1 |
| 3 | IMS status code (Note) | X |

For an IMS registration error, the IMS status code will contain the status code(s) contained in the response message to the IMS REGISTER message specified in, for example, TS 24.229 and RFC 3261.

The status code is coded pursuant to TS 24.229.

Referring again to FIG. 6, in certain embodiments, the system for communicating IMS registration error via a Network Rejection Event enhances a cause code parameter by allowing the cause code to be larger than one byte. In this embodiment, the Network Rejection event mechanism is expanded to contain a cause code to support variable length cause codes. In this embodiment, the formatting of the Network Rejection Event is different from that set forth above.

Referring again to FIG. 7, a mapping of an event driven information extension is shown. In this mapping, one bit is used for a Network Rejection Event for a GERAN/UTRAN network and one bit is used to indicate a Network Rejection Event for a E-UTRAN network. More specifically, in this embodiment, the UICC discovers support of the network rejection event feature by reading $5^{th}$ and $7^{th}$ bit of the Twenty-fifth byte of the profile download sent by the ME.

If the event driven information extension is supported in any radio technology, the UICC proceeds with registering the Network Rejection event in a SETUP EVENT LIST (U)SAT command to enable receipt of the rejection messages. More specifically, the UICC uses the SETUP EVENT LIST (U)SAT command to supply a set of events. This set of events becomes the current list of events for which the terminal is to monitor. Any subsequent SET UP EVENT LIST command replaces the current list of events supplied in the previous SET UP EVENT LIST command. The SET UPEVENT LIST command may also be used to remove the entire list of events that is current in the terminal (see e.g., clause 6.6.16 of ETSI TS 102 223 v9.1.0). The list of events provided by the UICC in the last SET UP EVENT LIST command is removed if the terminal is powered off or the UICC is removed or a reset is performed.

When the terminal has successfully accepted or removed the list of events, the terminal sends a TERMINAL RESPONSE (OK) message to the UICC. When the terminal is not able to successfully accept or remove the list of events, the terminal sends a TERMINAL RESPONSE (Command beyond terminal's capabilities) message to the UICC. When one of the events in the current list occurs, then the terminal uses the Event Download mechanism to transfer details of the event to the UICC (see e.g., clause 7.5 of ETSI TS 102 223 v9.1.0 and 3GPP 31.111 v. 9.1.0).

For the event list byte coding, a plurality of values are defined in addition to those in ETSI TS 102 223. These values include:

11=I-WLAN Access Status.

12=Network Rejection

15=CSG cell selection

When the ME receives an IMS registration error message from the network in response to an IMS REGISTER message and the Network Rejection event is registered on the rejection Event list the ME informs the UICC that this event has occurred.

More specifically, if the Network Rejection event is part of the current event list (as set up by the last SET UP EVENT LIST command, (see e.g., ETSI TS 102 223), then, in the case of GERAN/UTRAN if the terminal receives a LOCATION UPDATING REJECT message or a GPRS ATTACH REJECT message or a ROUTING AREA UPDATE REJECT message (as defined in TS 24.008) or is unsuccessful in registering to IMS or in the case of E-UTRAN if the terminal receives an ATTACH REJECT message, TRACKING AREA UPDATE REJECT message or is unsuccessful in registering to IMS, the terminal informs the UICC that this event has occurred, by using the ENVELOPE (EVENT DOWNLOAD—Network Rejection Event) command. The direction of the command is ME to UICC and the command header is specified in 3GPP TS 31.101. The structure of the ENVELOPE (EVENT DOWNLOAD—Network Rejection Event) command is set forth in Table 5.

Command parameters/data.

TABLE 5

| Description | Clause | M/O | Min | Length |
|---|---|---|---|---|
| Event download tag | 9.1 | M | Y | 1 |
| Length (A + B + (C or D or I) + E + F + G + H) + J | — | M | Y | 1 |
| Event list | 8.25 | M | Y | A |
| Device identities | 8.7 | M | Y | B |
| Location Information | 8.19 | C | N | C |
| Routing Area Identification | 8.91 | C | N | D |
| Tracking Area Identification | 8.99 | C | N | I |
| Access Technology | 8.62 | M | Y | E |
| Update/Attach Type | 8.92 | M | Y | G |
| Rejection Cause Code | 8.93 | M | Y | H |

Event list: the Event list data object shall contain only one event (value part of length 1 byte), and terminal shall set the event to:
Network Rejection Event.
Device identities: the terminal shall set the device identities to:
source: Network;
destination: UICC.
Location information: This data object shall only be present when the ME receives a LOCATION UPDATING REJECT message, and shall contain the identification (MCC, MNC, and LAC) of the rejecting network.
Routing Area Identification: This data object shall only be present when the ME receives a GPRS ATTACH REJECT message or a ROUTING AREAD UPDATE REJECT message and shall contain the identification (MCC, MNC, LAC and RAC) of the rejecting network
Tracking Area Identification: This data object shall only be present when the ME receives an EMM ATTACH REJECT or a TRACKING AREA UPDATE REJECT message and shall contain the identification (MCC, MNC and TAC) of the rejecting network.
Access Technology: This data object shall contain the access technology of the rejecting network.
Update/Attach Type: This data object contains the update or attach type that was used in the registration request message.
Rejection Cause Code: This data object contains the cause code value that was received in the registration or the status code received in response to the IMS REGISTER message.

The update and attach parameters for the message are set forth in Table 6.

TABLE 6

| Byte(s) | Description | Length |
|---|---|---|
| 1 | Update/Attach Type Tag | 1 |
| 2 | Length | 1 |
| 3 | Update/Attach Type | 1 |

Contents:
In the case of GERAN/UTRAN, the terminal shall use this information as a mechanism to indicate to the UICC the location updating type that was sent in the LOCATION UPDATING REQUEST MESSAGE or the update type that was sent in the GPRS ATTACH REQUEST or ROUTING AREA UPDATING REQUEST message, as specified in TS 24.008 [9].

In the case of E-UTRAN, the terminal shall use this information as a mechanism to indicate to the UICC the EPS attach type that was sent in the ATTACH REQUEST or TRACKING AREA UPDATE REQUEST message, as specified in TS 24.301 [46].

In the case of an unsuccessful registration to IMS, the terminal shall use this information as a mechanism to indicate to the UICC that an IMS REGISTER message was transmitted, as specified in TS 24.229.

Coding:
- '00'="Normal Location Updating" in the case of a LOCATION UPDATING REQUEST message;
- '01'="Periodic Updating" in the case of a LOCATION UPDATING REQUEST message;
- '02'="IMSI Attach" in the case of a LOCATION UPDATING REQUEST message;
- '03'="GPRS Attach" in the case of a GPRS ATTACH REQUEST message;
- '04'="Combined GPRS/IMSI Attach" in the case of a GPRS ATTACH REQUEST message;
- '05'="RA Updating" in the case of a ROUTING AREA UPDATE REQUEST message;
- '06'="Combined RA/LA Updating" in the case of a ROUTING AREA UPDATE REQUEST message;
- '07'="Combined RA/LA Updating with IMSI Attach" in the case of a ROUTING AREA UPDATE REQUEST message;
- '08'="Periodic Updating" in the case of a ROUTING AREA UPDATE REQUEST message
- '09'="EPS Attach" in the case of an EMM ATTACH REQUEST message
- '0A'="Combined EPS/IMSI Attach" in the case of an EMM ATTACH REQUEST message
- '0B'="TA updating" in the case of an EMM TRACKING AREA UPDATE REQUEST message
- '0C'="Combined TA/LA updating" in the case of an EMM TRACKING AREA UPDATE REQUEST message
- '0D'="Combined TA/LA updating with IMSI attach" in the case of an EMM TRACKING AREA UPDATE REQUEST message
- '0E'="Periodic updating" in the case of an EMM TRACKING AREA UPDATE REQUEST message
- '0F'=IMS REGISTER message.

All other values are reserved for future use

The rejection cause code object parameters for the message are set forth in Table 7.

TABLE 7

| Byte(s) | Description | Length |
|---|---|---|
| 1 | Rejection Cause Code Tag | 1 |
| 2 | Length | 1 |
| 3 | Rejection Cause Code (Note) | 1 |
| 4 | IMS status code | X |

For GERAN/UTRAN, in the case of a LOCATION UPDATING REJECT message, this object shall contain the Reject Cause as received in the LOCATION UPDATING REJECT message. The Reject Cause is coded in the same manner as the value part of the Reject Cause information element as specified in TS 24.008

For GERAN/UTRAN, in the case of a GPRS ATTACH REJECT message or a ROUTING AREA UPDATE REJECT message, this object shall contain the GMM Cause as received in the GPRS ATTACH REJECT message or ROUTING AREA UPDATE REJECT message. The GMM Cause is coded in the same manner as the value part of the GMM Cause information element as specified in TS 24.008.

For E-UTRAN, in the case of an EMM ATTACH REJECT message or an EMM TRACKING AREA UPDATE REJECT message, this object shall contain the EMM Cause are received in the EMM ATTACH REJECT message or EMM TRACKING AREA UPDATE REJECT message. The EMM Cause is coded in the same manner as the value part of the EMM Cause information element as specified in TS 24.301.

For an IMS registration error, the IMS status code contains the status code received in response to the IMS REGISTER message specified in TS 24.229. The status code is coded as pursuant to TS 24.229 and RFC 3621. For an IMS registration error, the Rejection Cause code is coded as '0xFF'.

In another embodiment, the Rejection Cause Code data object length itself is extended to allow for cause codes lager than 1 byte. In the case where the ME receives an error in response to an IMS REGISTER message, the status code received from the network is coded in the Rejection Cause Code field of the Rejection Cause Code data object. The status code is coded as pursuant to TS 24.229 and RFC 3621. The Rejection Cause Code data object parameters are set forth in Table 8.

TABLE 8

| Byte(s) | Description | Length |
|---|---|---|
| 1 | Rejection Cause Code Tag | 1 |
| 2 | Length | 1 |
| 3 | Rejection Cause Code (Note) | X |

Figure 8:
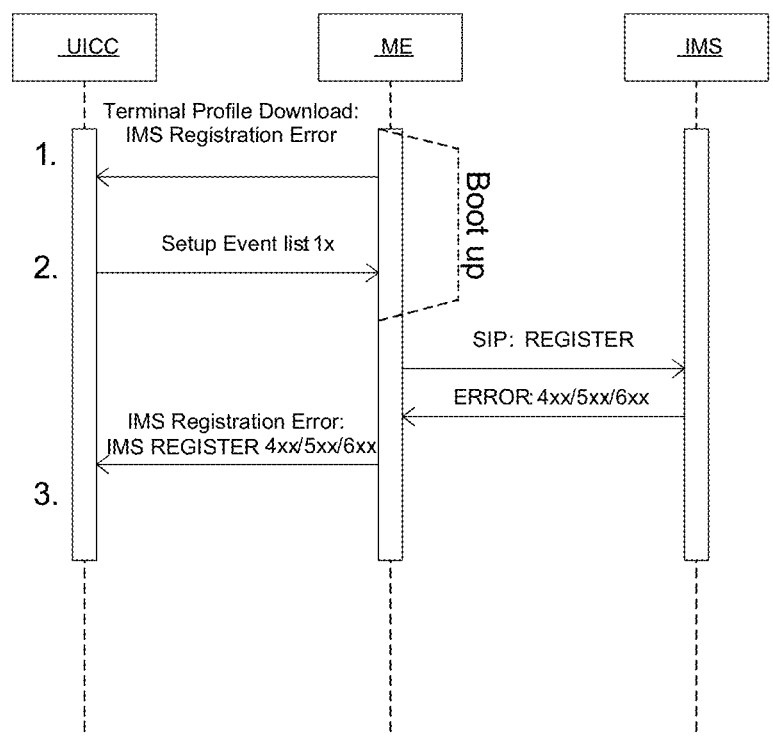
FIG. 8 shows a flow diagram of an IMS registration error being communicated via a IMS registration error Event.

Referring to FIG. 8, in certain embodiments, a flow diagram of the operation of a system for communicating IMS registration error via a Registration Error Event is shown. More specifically, in certain embodiments an IMS Registration Event is provided which supports IMS registration errors.

In this embodiment, the UICC discovers support of the IMS registration error event feature by the appropriate bit in a byte (e.g., the thirty first byte) introduced in the profile download sent by the ME.

Figure 9:
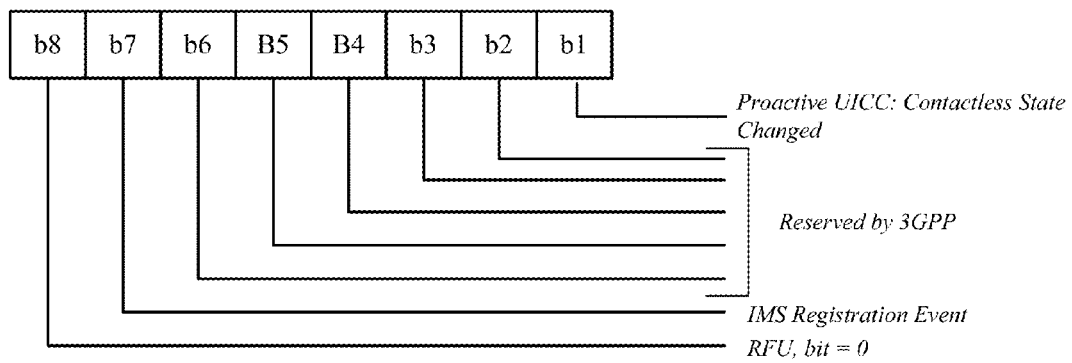
FIG. 9 shows a mapping of a download profile byte.

FIG. 9 shows a mapping of an example of the download profile byte.

If the event driven information extension is supported in any radio technology, the UICC proceeds with registering the IMS registration error event in a SETUP EVENT LIST (U)SAT command to enable receipt of the IMS registration error messages. More specifically, the UICC uses the SETUP EVENT LIST (U)SAT command to supply a set of events. This set of events becomes the current list of events for which the terminal is to monitor. Any subsequent SET UP EVENT LIST command replaces the current list of events supplied in the previous SET UP EVENT LIST command. The SET UPEVENT LIST command may also be used to remove the entire list of events that is current in the terminal (see e.g., clause 6.6.16 of ETSI TS 102 223 v9.1.0). The list of events provided by the UICC in the last SET UP EVENT LIST command is removed if the terminal is powered off or the UICC is removed or a reset is performed.

When the terminal has successfully accepted or removed the list of events, the terminal sends a TERMINAL RESPONSE (OK) message to the UICC. When the terminal is not able to successfully accept or remove the list of events, the terminal sends a TERMINAL RESPONSE (Command beyond terminal's capabilities) message to the UICC. When one of the events in the current list occurs, then the terminal uses the Event Download mechanism to transfer details of the event to the UICC (see e.g., clause 7.5 of ETSI TS 102 223 v9.1.0 and 3GPP 31.111 v. 9.1.0).

In one embodiment the Event Download mechanism can contain very different information to indicate either a successful event or an unsuccessful event (as described below).

For the event list byte coding, a plurality of values are defined in addition to those in ETSI TS 102 223. These values include:

11=I-WLAN Access Status.
12=Network Rejection
15=CSG cell selection
1x=IMS registration error When the ME receives a status code, not limited to a status code indicating an error, in response to the IMS REGISTER message from the network and the IMS registration error event is registered on the Event list the ME informs the UICC that this event has occurred.

More specifically, if the IMS registration error event is part of the current event list (as set up by the last SET UP EVENT LIST command, see ETSI TS 102.223), then, in the case of a response indicative (but not limited to) of an error to the IMS REGISTER messages, the terminal informs the UICC that an IMS registration error event has occurred, by using the ENVELOPE (EVENT DOWNLOAD—IMS registration error) command. The direction of the command is ME to UICC and the command header is specified in 3GPP TS 31.101. The structure of the ENVELOPE (EVENT DOWNLOAD—IMS registration error) command is set forth in Table 9.

Command parameters/data.

TABLE 9

| Description | Clause | M/O | Min | Length |
|---|---|---|---|---|
| Event download tag | 9.1 | M | Y | 1 |
| Length (A + B + (C or D or I) + E + F + G + H) + J | — | M | Y | 1 |
| Event list | 8.25 | M | Y | A |
| Device identities | 8.7 | M | Y | B |
| IMS Message Type | 8.9X | M | Y | G |
| IMS status code | 8.9Y | M | Y | H |

Event list: the Event list data object shall contain only one event (value part of length 1 byte), and terminal shall set the event to:

IMS registration error.

Device identities: the terminal shall set the device identities to:

source: Network;
destination: UICC.
IMS Message Type: This data object contains the message type sent to the IMS Network
IMS Status-Code: This data object contains the status code value that was received in the response to the IMS REGISTER message. This data object will only be present during an unsuccessful IMS REGISTRATION.

Response parameters/data: None for this type of ENVELOPE command.

The update and attach parameters for the message are set forth in Table 10.

TABLE 10

| Byte(s) | Description | Length |
|---|---|---|
| 1 | IMS Message Type Tag | 1 |
| 2 | Length | 1 |
| 3 | IMS Message Type | 1 |

Contents:
In the case of an unsuccessful registration to IMS, the terminal shall use this information as a mechanism to indicate to the UICC that IMS REGISTER message was transmitted, as specified in TS 24.229.
Coding:
'01'=IMS REGISTER message.
All other values are reserved for future use
The status code object parameters for the message are set forth in Table 11.

TABLE 11

| Byte(s) | Description | Length |
|---|---|---|
| 1 | IMS Status-code Tag | 1 |
| 2 | Length | 1 |
| 3 | IMS Status-code (Note) | X |

For IMS registration error, the IMS Status-code contains the Status-code contained in the response to the IMS REGISTER message specified in TS 24.229. The status code is coded as pursuant to TS 24.229.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 10:
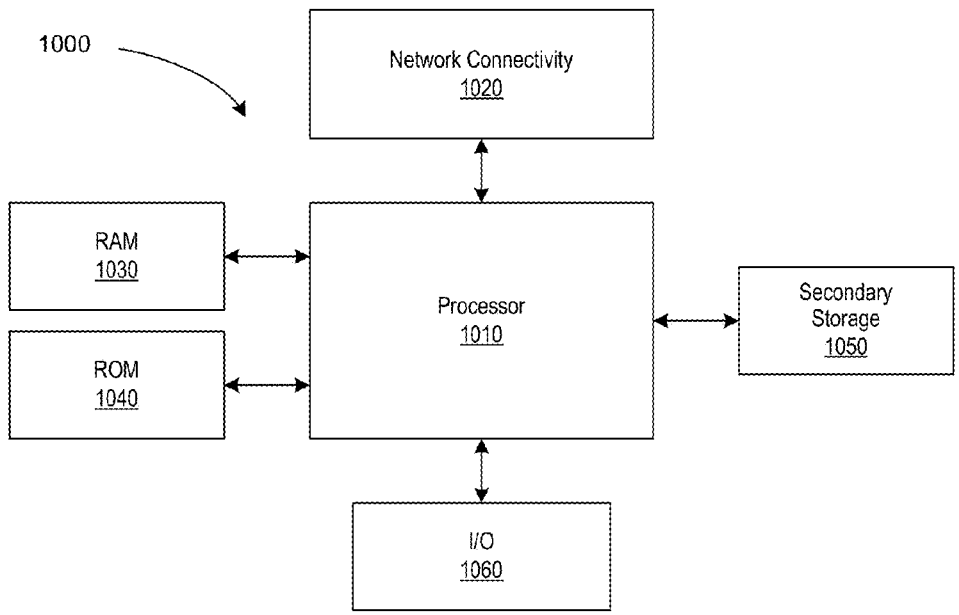
FIG. 10 depicts an exemplary system in which the present invention may be implemented.

FIG. 10 illustrates an example of a system 1000 suitable for implementing one or more embodiments disclosed herein. In various embodiments, the system 1000 comprises a processor 1010, which may be referred to as a central processor unit (CPU) or digital signal processor (DSP), network connectivity devices 1020, random access memory (RAM) 1030, read only memory (ROM) 1040, secondary storage 1050, and input/output (I/O) devices 1060. In some embodiments, some of these components may not be present or may be combined in various combinations with one another or with other components not shown. These components may be located in a single physical entity or in more than one physical entity. Any actions described herein as being taken by the processor 1010 might be taken by the processor 1010 alone or by the processor 1010 in conjunction with one or more components shown or not shown in FIG. 10.

The processor 1010 executes instructions, codes, computer programs, or scripts that it might access from the network connectivity devices 1020, RAM 1030, or ROM 1040. While only one processor 1010 is shown, multiple processors may be present. Thus, while instructions may be discussed as being executed by a processor 1010, the instructions may be executed simultaneously, serially, or otherwise by one or multiple processors 1010 implemented as one or more CPU chips.

In various embodiments, the network connectivity devices 1020 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices (such as e.g., WCDMA, HSPA and LTE type devices), worldwide interoperability for microwave access (WiMAX) devices, and/or other well-known devices for connecting to networks. These network connectivity devices 1020 may enable the processor 1010 to communicate with the Internet or one or more telecommunications networks or other networks from which the processor 1010 might receive information or to which the processor 1010 might output information.

The network connectivity devices 1020 may also be capable of transmitting or receiving data wirelessly in the form of electromagnetic waves, such as radio frequency signals or microwave frequency signals. Information transmitted or received by the network connectivity devices 1020 may include data that has been processed by the processor 1010 or instructions that are to be executed by processor 1010. The data may be ordered according to different sequences as may be desirable for either processing or generating the data or transmitting or receiving the data.

In various embodiments, the RAM 1030 may be used to store volatile data and instructions that are executed by the processor 1010. The ROM 1040 shown in FIG. 10 may be used to store instructions and perhaps data that are read during execution of the instructions. Access to both RAM 1030 and ROM 1040 is typically faster than to secondary storage 1050. The secondary storage 1050 is typically comprised of one or more disk drives or tape drives and may be used for non-volatile storage of data or as an over-flow data storage device if RAM 1030 is not large enough to hold all working data. Secondary storage 1050 may be used to store programs that are loaded into RAM 1030 when such programs are selected for execution. The I/O devices 1060 may include liquid crystal displays (LCDs), touch screen displays, keyboards, keypads, switches, dials, mice, track balls, voice recognizers, card readers, paper tape readers, printers, video monitors, or other well-known input/output devices.

Figure 11:
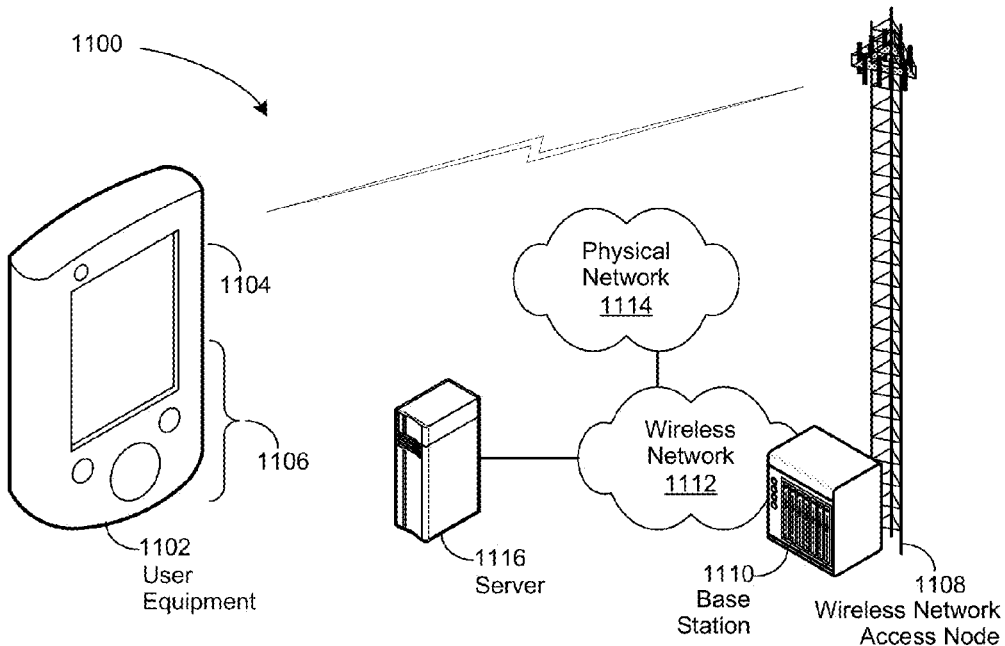
FIG. 11 shows a wireless communications system including an embodiment of a user equipment (UE).

FIG. 11 shows a wireless communications system including an embodiment of user equipment (UE) 1102. Though illustrated as a mobile phone, the UE 1102 may take various forms including a wireless handset, a pager, a personal digital assistant (PDA), a portable computer, a tablet computer, or a laptop computer. Many suitable devices combine some or all of these functions. In some embodiments, the UE 1102 is not a general purpose computing device like a portable, laptop or tablet computer, but rather is a special-purpose communications device such as a mobile phone, a wireless handset, a pager, a PDA, or a telecommunications device installed in a vehicle. The UE 1102 may likewise be a device, include a device, or be included in a device that has similar capabilities but that is not transportable, such as a desktop computer, a set-top box, or a network node. In these and other embodiments, the UE 1102 may support specialized activities such as gaming, inventory control, job control, and/or task management functions, and so on.

In various embodiments, the UE 1102 includes a display 1104. The UE 1102 likewise includes a touch-sensitive surface, a keyboard or other input keys 1106 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 1102 may likewise present options for the user to select, controls for the user to actuate, and cursors or other indicators for the user to direct.

The UE 1102 may further accept data entry from the user, including numbers to dial or various parameter values for configuring the operation of the UE 1102. The UE 1102 may further execute one or more software or firmware applications in response to user commands. These applications may configure the UE 1102 to perform various customized functions in response to user interaction. Additionally, the UE 1102 may be programmed or configured over-the-air (OTA), for example from a wireless base station 1110, a server 1116, a wireless network access node 1108, or a peer UE 1102.

Among the various applications executable by the UE 1000 are a web browser, which enables the display 1104 to display a web page. The web page may be obtained via wireless communications with a wireless network access node 1108, such as a cell tower, a peer UE 1102, or any other wireless communication network 1112 or system. In various embodiments, the wireless network 1112 is coupled to a wired network 1114, such as the Internet. Via the wireless network 1112 and the wired network 1114, the UE 1102 has access to information on various servers, such as a server 1116. The server 1116 may provide content that may be shown on the display 1104. Alternately, the UE 1102 may access the wireless network 1112 through a peer UE 1102 acting as an intermediary, in a relay type or hop type of connection. Skilled practitioners of the art will recognized that many such embodiments are possible and the foregoing is not intended to limit the spirit, scope, or intention of the disclosure.

Figure 12:
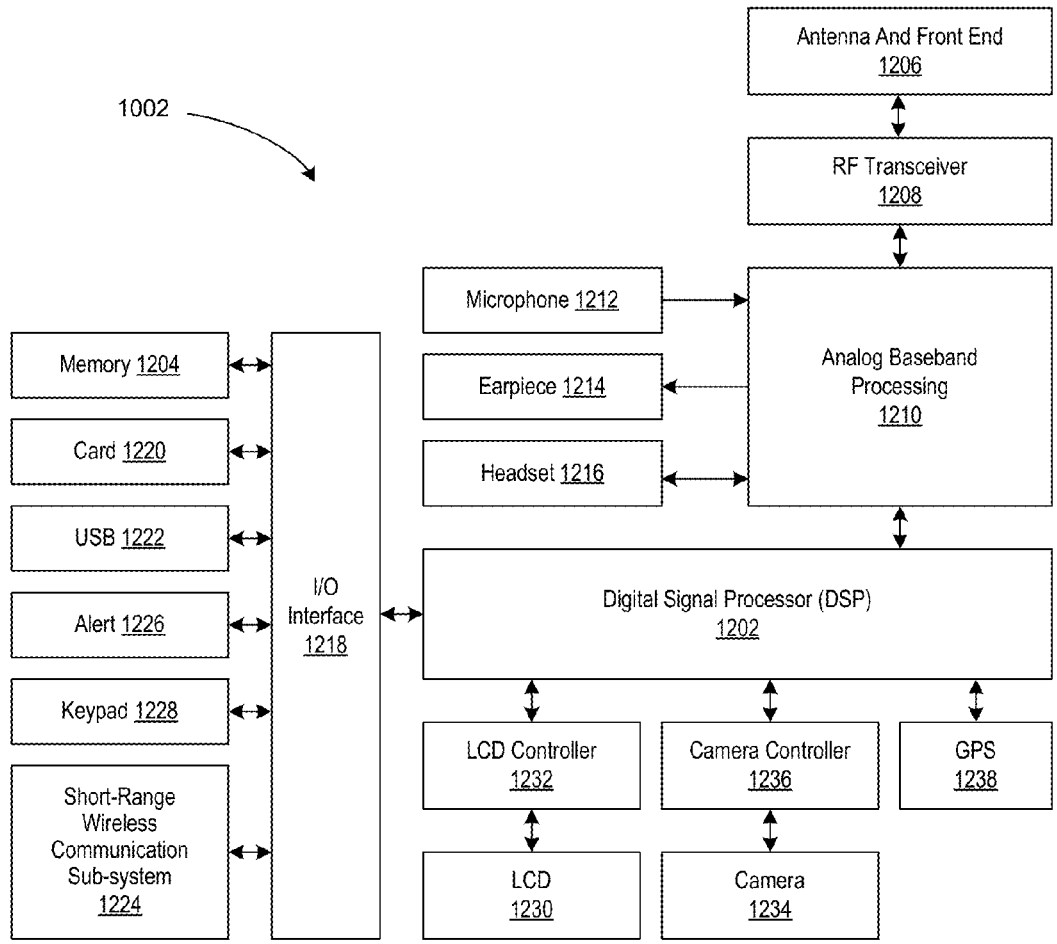
FIG. 12 is a simplified block diagram of an exemplary UE comprising a digital signal processor (DSP).

FIG. 12 depicts a block diagram of an exemplary user equipment (UE) 1102 in which the present invention may be implemented. While various components of a UE 1102 are depicted, various embodiments of the UE 1102 may include a subset of the listed components or additional components not listed. As shown in FIG. 12, the UE 1102 includes a digital signal processor (DSP) 1202 and a memory 1204. As shown, the UE 1102 may further include an antenna and front end unit 1206, a radio frequency (RF) transceiver 1208, an analog baseband processing unit 1210, a microphone 1212, an earpiece speaker 1214, a headset port 1216, an input/output (I/O) interface 1218, a removable memory card 1220, a universal serial bus (USB) port 1222, a short range wireless communication sub-system 1224, an alert 1226, a keypad 1228, a liquid crystal display (LCD) 1230, which may include a touch sensitive surface, an LCD controller 1232, a charge-coupled device (CCD) camera 1234, a camera controller 1236, and a global positioning system (GPS) sensor 1238. In various embodiments, the UE 1102 may include another kind of display that does not provide a touch sensitive screen. In an embodiment, the DSP 1202 may communicate directly with the memory 1204 without passing through the input/output interface 1218.

In various embodiments, the DSP 1202 or some other form of controller or central processing unit (CPU) operates to control the various components of the UE 1102 in accordance with embedded software or firmware stored in memory 1204 or stored in memory contained within the DSP 1202 itself. In addition to the embedded software or firmware, the DSP 1202 may execute other applications stored in the memory 1204 or made available via information carrier media such as portable data storage media like the removable memory card 1220 or via wired or wireless network communications. The application software may comprise a compiled set of machine-readable instructions that configure the DSP 1202 to provide the desired functionality, or the application software may be high-level software instructions to be processed by an interpreter or compiler to indirectly configure the DSP 1202.

The antenna and front end unit 1206 may be provided to convert between wireless signals and electrical signals, enabling the UE 1102 to send and receive information from a cellular network or some other available wireless communications network or from a peer UE 1102. In an embodiment, the antenna and front end unit 1106 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 1206 may include antenna tuning or impedance matching components, RF power amplifiers, or low noise amplifiers.

In various embodiments, the RF transceiver 1208 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1210 or the DSP 1202 or other central processing unit. In some embodiments, the RF Transceiver 1008, portions of the Antenna and Front End 1206, and the analog base band processing unit 1210 may be combined in one or more processing units and/or application specific integrated circuits (ASICs).

The analog baseband processing unit 1210 may provide various analog processing of inputs and outputs, for example analog processing of inputs from the microphone 1212 and the headset 1216 and outputs to the earpiece 1214 and the headset 1216. To that end, the analog baseband processing unit 1210 may have ports for connecting to the built-in microphone 1212 and the earpiece speaker 1214 that enable the UE 1102 to be used as a cell phone. The analog baseband processing unit 1210 may further include a port for connecting to a headset or other hands-free microphone and speaker configuration. The analog baseband processing unit 1210 may provide digital-to-analog conversion in one signal direction and analog-to-digital conversion in the opposing signal direction. In various embodiments, at least some of the functionality of the analog baseband processing unit 1210 may be provided by digital processing components, for example by the DSP 1202 or by other central processing units.

The DSP 1202 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1202 may perform modulation, coding, interleaving, and spreading, and for a receiver function the DSP 1202 may perform despreading, deinterleaving, decoding, and demodulation. In another embodiment, for example in an orthogonal frequency division multiplex access (OFDMA) technology application, for the transmitter function the DSP 1202 may perform modulation, coding, interleaving, inverse fast Fourier transforming, and cyclic prefix appending, and for a receiver function the DSP 1202 may perform cyclic prefix removal, fast Fourier transforming, deinterleaving, decoding, and demodulation. In other wireless technology applications, yet other signal processing functions and combinations of signal processing functions may be performed by the DSP 1202.

The DSP 1202 may communicate with a wireless network via the analog baseband processing unit 1210. In some embodiments, the communication may provide Internet connectivity, enabling a user to gain access to content on the Internet and to send and receive e-mail or text messages. The input/output interface 1218 interconnects the DSP 1202 and various memories and interfaces. The memory 1204 and the removable memory card 1220 may provide software and data to configure the operation of the DSP 1202. Among the interfaces may be the USB interface 1222 and the short range wireless communication sub-system 1224. The USB interface 1222 may be used to charge the UE 1102 and may also enable the UE 1102 to function as a peripheral device to exchange information with a personal computer or other computer system. The short range wireless communication sub-system 1224 may include an infrared port, a Bluetooth interface, an IEEE 802.11 compliant wireless interface, or any other short range wireless communication sub-system, which may enable the UE 1102 to communicate wirelessly with other nearby mobile devices and/or wireless base stations.

The input/output interface 1218 may further connect the DSP 1202 to the alert 1226 that, when triggered, causes the UE 1102 to provide a notice to the user, for example, by ringing, playing a melody, or vibrating. The alert 1226 may serve as a mechanism for alerting the user to any of various events such as an incoming call, a new text message, and an appointment reminder by silently vibrating, or by playing a specific pre-assigned melody for a particular caller.

The keypad 1228 couples to the DSP 1202 via the I/O interface 1218 to provide one mechanism for the user to make selections, enter information, and otherwise provide input to the UE 1102. The keyboard 1228 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 1230, which may include touch screen capability and also display text and/or graphics to the user. The LCD controller 1232 couples the DSP 1202 to the LCD 1230.

The CCD camera 1234, if equipped, enables the UE 1102 to take digital pictures. The DSP 1202 communicates with the CCD camera 1234 via the camera controller 1236. In another embodiment, a camera operating according to a technology other than Charge Coupled Device cameras may be employed. The GPS sensor 1238 is coupled to the DSP 1202 to decode global positioning system signals, thereby enabling the UE 1102 to determine its position. Various other peripherals may also be included to provide additional functions, such as radio and television reception.

Figure 13:
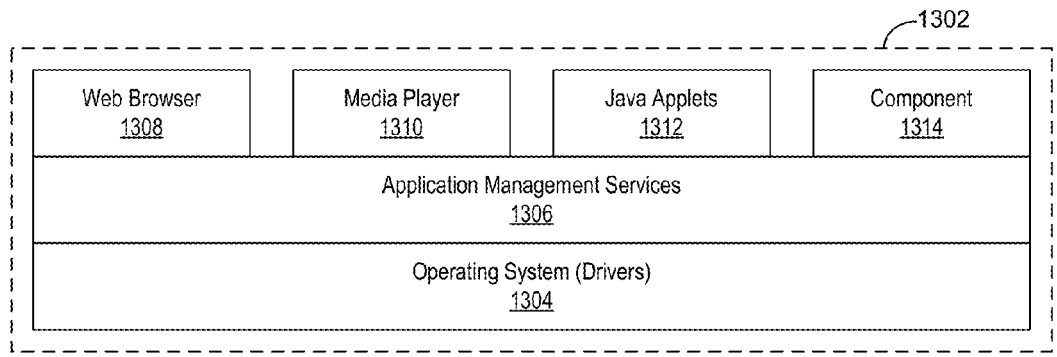
FIG. 13 is a simplified block diagram of a software environment that may be implemented by the DSP.

FIG. 13 illustrates a software environment 1302 that may be implemented by the DSP 1202. The DSP 1202 executes operating system drivers 1304 that provide a platform from which the rest of the software operates. The operating system drivers 1304 provide drivers for the UE 1102 hardware with standardized interfaces that are accessible to application software. The operating system drivers 1304 include application management services (AMS) 1306 that transfer control between applications running on the UE 1102. Also shown in FIG. 13 are a web browser application 1308, a media player application 1310, and Java applets 1312. The web browser application 1308 configures the UE 1102 to operate as a web browser, allowing a user to enter information into forms and select links to retrieve and view web pages. The media player application 1310 configures the UE 1102 to retrieve and play audio or audiovisual media. The Java applets 1312 configure the UE 1102 to provide games, utilities, and other functionality. A component 1314 might provide functionality described herein. The UE 1102, a base station 1110, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes. Also, as used herein, the term UE refers to a device which includes a memory card whereas a device which does not include a memory card is generally referred to as an ME. In other words, a UE is the combination of an ME with a memory card.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method on a Mobile Equipment (ME) for managing Internet Protocol (IP) Multimedia Subsystem (IMS) communication, the method comprising:
    sending, to a universal integrated circuit card (UICC), a download profile, the download profile indicating support for an IMS Registration Event and a second event corresponding to a network error unrelated to IMS registration;
    in response to sending the download profile, receiving, from the UICC, a SET UP EVENT LIST command setting up a current event list, the current event list including the IMS Registration Event and the second event;

sending a registration message from the ME to the IMS, wherein the registration message is associated with an IMS message type;

in response to the registration message, receiving, by the ME from the IMS, a notification regarding registration in the IMS;

receiving, by the ME, an indication of the network error corresponding to the second event;

in response to receiving the indication of the network error, notifying the UICC of the network error based on the second event in the current event list;

when the notification regarding registration in the IMS indicates that IMS registration was unsuccessful:
  determining to notify the UICC of the unsuccessful IMS registration based on the IMS Registration Event in the current event list;
  in response to the determining, providing the UICC with an IMS status code associated with the notification regarding registration in the IMS, wherein the IMS status code is provided using an ENVELOPE command, and the ENVELOPE command includes an IMS Status Code data object indicating the IMS status code; and
  providing, in the ENVELOPE command, the UICC with the IMS message type of the registration message the ME sent to the IMS; and when the notification regarding registration in the IMS indicates that IMS registration was successful:
  providing, in the ENVELOPE command, the UICC with the IMS message type of the registration message the ME sent to the IMS and not providing a status code.

2. The method of claim 1 wherein providing the UICC with the IMS status code further comprises:
  generating a Network Rejection Event universal terrestrial radio access network (UTRAN) SIM (USIM) Application Toolkit (USAT) command, the Network Rejection Event USAT command accommodating the unsuccessful IMS registration by providing a command parameter that includes the IMS status code.

3. The method of claim 2 wherein:
  the Network Rejection Event USAT command comprises an IMS status code parameter.

4. The method of claim 1 wherein providing the UICC with the IMS status code further comprises:
  generating an IMS Network Rejection Event USAT command, the IMS Network Rejection Event command supporting the unsuccessful IMS registration.

5. An apparatus for managing Internet Protocol (IP) Multimedia Sub system (IMS) communication comprising:
  a plurality of processors configured to:
    send, to a universal integrated circuit card (UICC), a download profile, the download profile indicating support for an IMS Registration Event and a second event corresponding to a network error unrelated to IMS registration;
    in response to sending the download profile, receive, from the UICC, a SET UP EVENT LIST command setting up a current event list, the current event list including the IMS Registration Event and the second event;
    send a registration message from the ME to the IMS, wherein the registration message is associated with an IMS message type;
    in response to the registration message, receive, by the apparatus from the IMS, a notification regarding registration in the IMS;
    receive, by the ME, an indication of the network error corresponding to the second event;
    in response to receiving the indication of the network error, notify the UICC of the network error based on the second event in the current event list;
    when the notification regarding registration in the IMS indicates that IMS registration was unsuccessful:
      determine to notify the UICC of the unsuccessful IMS registration based on the IMS Registration Event in the current event list;
      in response to the determining, provide the UICC with an IMS status code associated with the notification regarding registration in the IMS, wherein the IMS status code is provided using an ENVELOPE command, and the ENVELOPE command includes an IMS Status Code data object indicating the IMS status code; and
      provide, in the ENVELOPE command, the UICC with the IMS message type of the registration message the ME sent to the IMS; and
    when the notification regarding registration in the IMS indicates that IMS registration was successful:
      provide, in the ENVELOPE command, the UICC with the IMS message type of the registration message the ME sent to the IMS and not providing a status code.

6. The apparatus of claim 5 wherein the plurality of processors configured to provide the UICC with the IMS status code further comprises the plurality of processors configured to:
  generate a Network Rejection Event universal terrestrial radio access network (UTRAN) SIM (USIM) Application Toolkit (USAT) command, the Network Rejection Event USAT command accommodating the unsuccessful IMS registration by providing a command parameter that includes the IMS status code.

7. The apparatus of claim 6 wherein:
  the Network Rejection Event USAT command comprises an IMS status code parameter.

8. The apparatus of claim 5 wherein the plurality of processors configured to provide the UICC with the IMS status code further comprises the plurality of processors configured to:
  generate an IMS Network Rejection Event USAT command, the IMS Network Rejection Event command supporting the unsuccessful IMS registration.

9. The method of claim 1 wherein the network error corresponding to the second event is at least one of Location Updating Reject, GPRS Attach Reject, Routing Area Update Reject, Attach Reject, or Tracking Area Update Reject.

10. The apparatus of claim 5 wherein the network error corresponding to the second event is at least one of Location Updating Reject, GPRS Attach Reject, Routing Area Update Reject, Attach Reject, or Tracking Area Update Reject.

* * * * *